United States Patent [19]
Bode et al.

[11] Patent Number: 5,113,708
[45] Date of Patent: May 19, 1992

[54] APPARATUS TO MEASURE YARN TENSION

[75] Inventors: Jerry E. Bode, Greer; Ronnie E. Duckett, Chesnee, both of S.C.

[73] Assignee: Milliken Research Corporation, Spartanburg, S.C.

[21] Appl. No.: 616,384

[22] Filed: Nov. 21, 1990

[51] Int. Cl.$^5$ .............................................. G01L 5/10
[52] U.S. Cl. .................................. 73/862.41; 57/264
[58] Field of Search .................. 73/580, 581, 517 AV, 73/160, 704, 778, 862.07, 862.59, 862.41; 57/264

[56] References Cited

U.S. PATENT DOCUMENTS

| | | |
|---|---|---|
| 2,618,970 | 11/1952 | Hitchcock et al. |
| 2,744,408 | 5/1956 | Seney . |
| 3,273,380 | 9/1966 | Seney . |
| 3,854,329 | 12/1974 | Jones . |
| 4,376,368 | 3/1983 | Wilson ..................... 57/264 |
| 4,393,725 | 7/1983 | Satterfield . |
| 4,445,322 | 5/1984 | Satterfield . |
| 4,692,615 | 9/1987 | Mensah et al. |

FOREIGN PATENT DOCUMENTS 444081  9/1974  U.S.S.R. .
444956  9/1974  U.S.S.R. .

Primary Examiner—Reinhard J. Eisenzopf
Assistant Examiner—E. Shopbell
Attorney, Agent, or Firm—Kevin M. Kercher; H. William Petry

[57] ABSTRACT

An apparatus to cause a running length of yarn to vibrate at its harmonic frequency by through utilization of dual orifices through which pressurized air flows at an angle of intersection and to measure electronically the harmonic frequency thereof to provide a signal that can be employed to maintain and/or correct the parameters of the system to maintain a desired tension in the yarn being run.

19 Claims, 3 Drawing Sheets

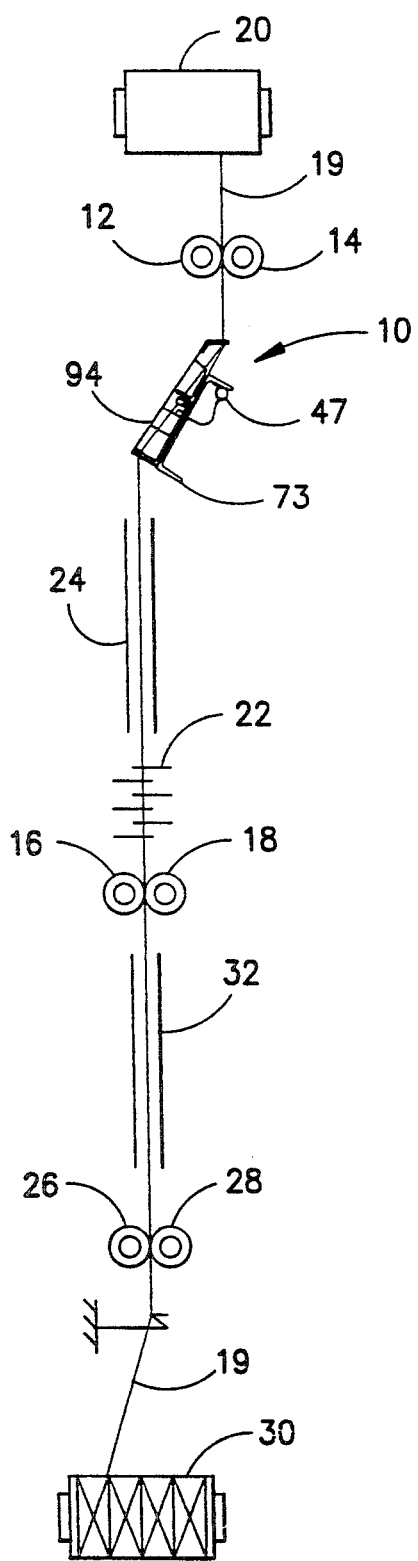
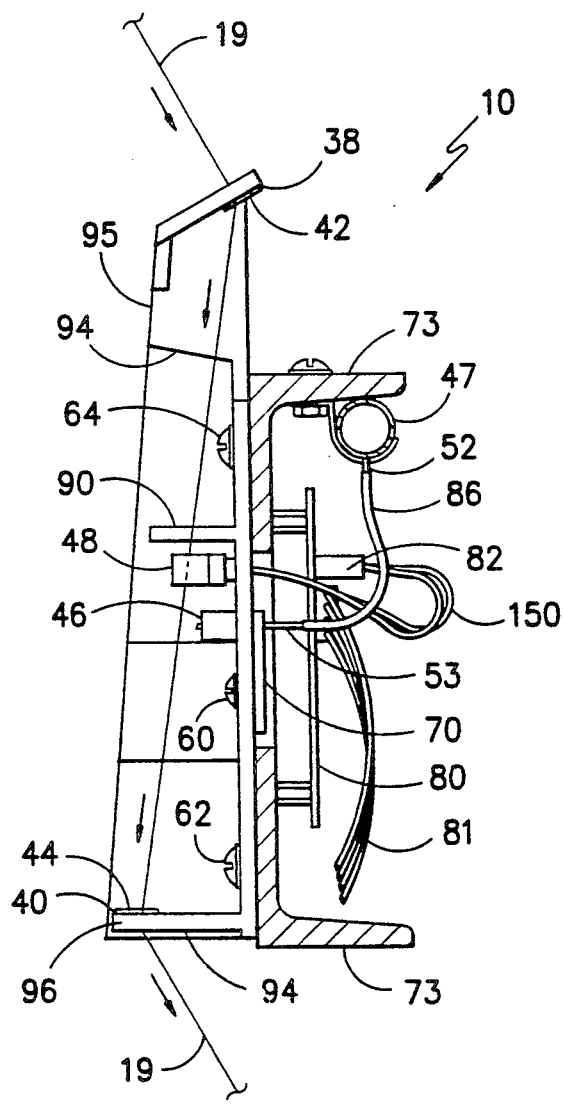
FIG. -1-
FIG. -2-

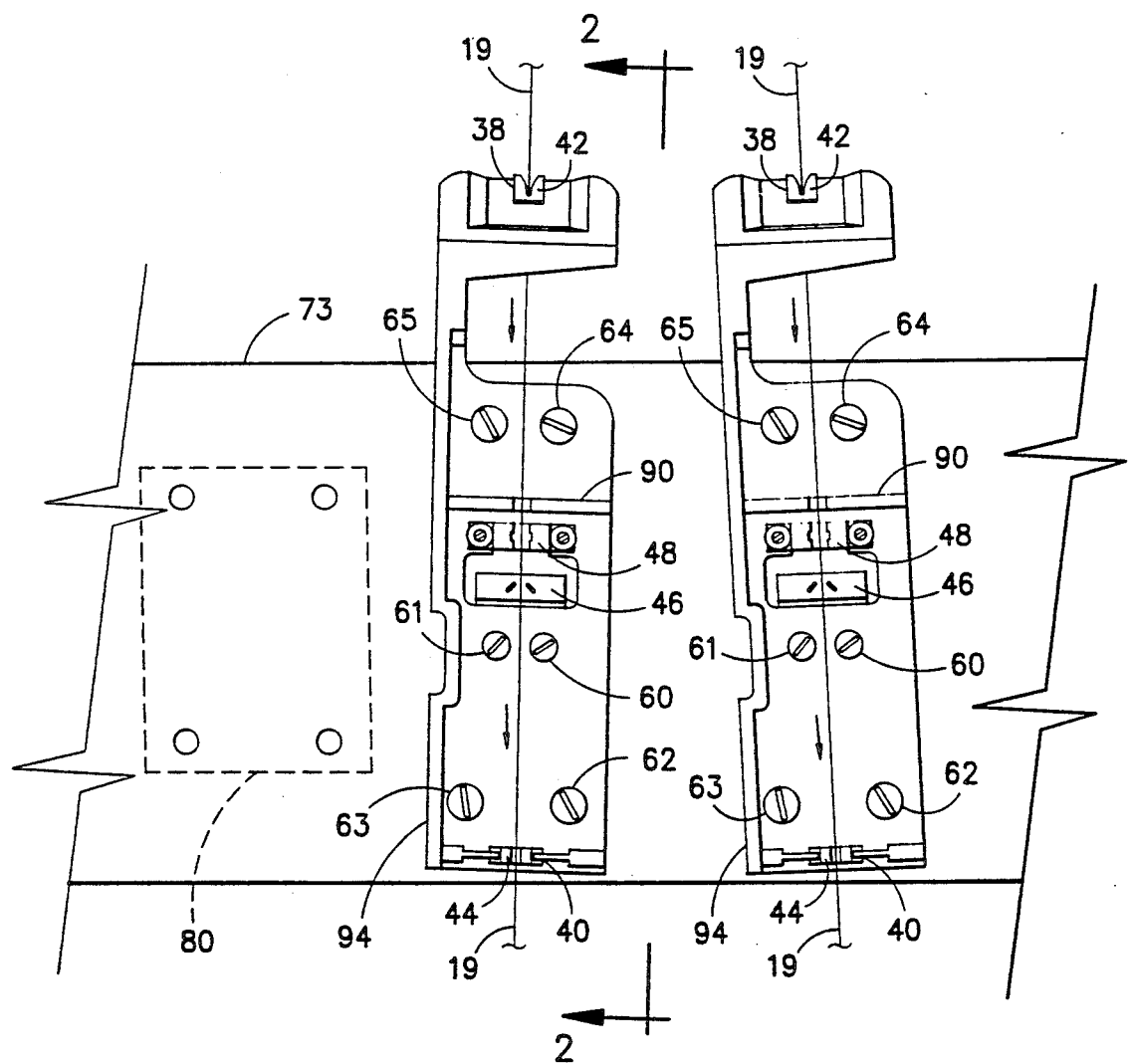
FIG. —3—

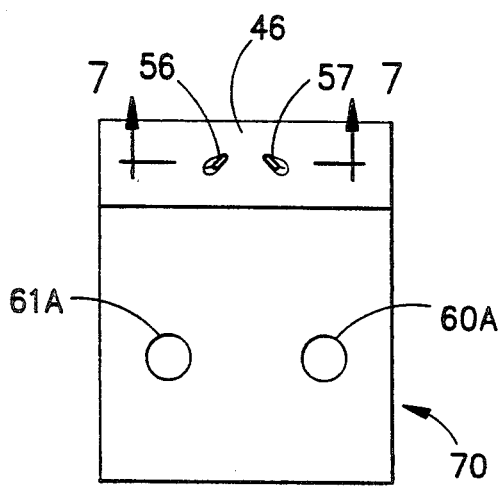
FIG. -4-
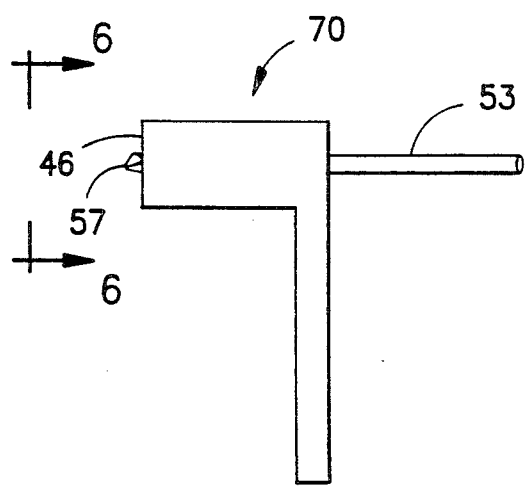
FIG. -5-
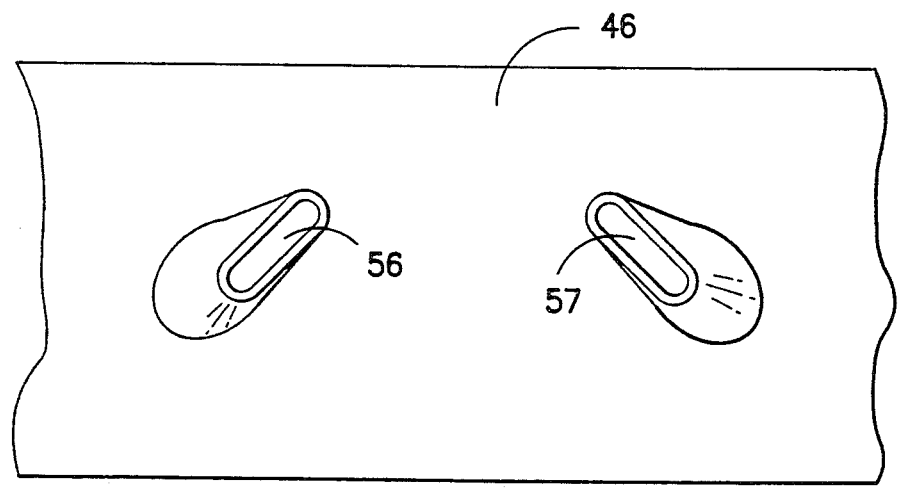
FIG. -6-
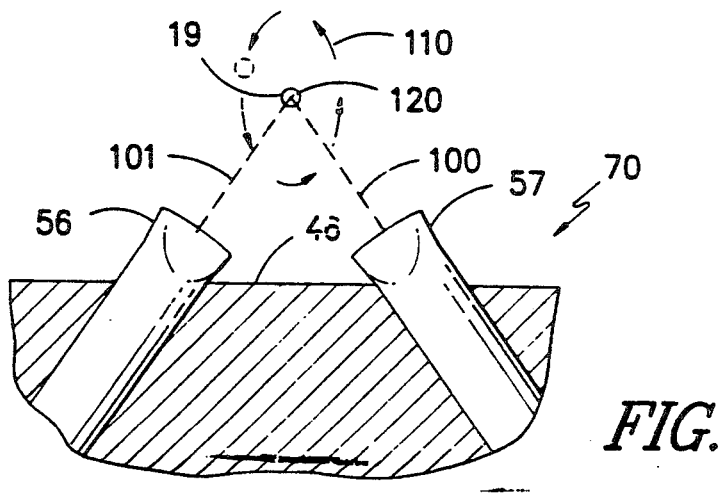
FIG. -7-

APPARATUS TO MEASURE YARN TENSION

BACKGROUND OF THE INVENTION

This invention relates to improved apparatus for measuring yarn tension. In most textile operations wherein a running strand of yarn is either produced, modified or fabricated, it is advantageous to maintain a constant yarn tension because variation in yarn tension cause unwanted effects in the yarn or the fabric being produced therefrom.

The problem with the apparatus currently used to measure yarn tension is that the air jets associated with them are very difficult to adjust, easily clogged in harsh environments, easily displaced from alignment and require relatively high air pressures of six to eight pounds per square inch.

The present invention solves the above problems in a manner not disclosed in the known prior art.

SUMMARY OF THE INVENTION

An apparatus to measure the tension in a running length of yarn comprising a frame and at least one pair of guide members attached to said frame and longitudinally spaced from one another to guide yarn from one end of said frame to the other end of said frame and a means to supply air under pressure to vibrate the yarn passing between the guide members to cause said yarn to vibrate at its harmonic frequency and comprising a first conduit and a second conduit mounted transversely to said first conduit and a second means mounted in said frame to measure the harmonic frequency of the yarn as it passes through said guide members.

It is an advantage of this invention to have improved yarn oscillation that provides more accurate tension readings.

It is another advantage of this invention to have an air jet means with very little need for adjustment, which improves reliability and stability of calibration.

Yet another advantage of this invention is to have lower air consumption.

Still another advantage of this invention is to have lower air pressures.

Another advantage of this invention is that it is tolerant of harsh environmental conditions in that the air jets do not easily clog.

These and other advantages will be in part obvious and in part pointed out below.

BRIEF DESCRIPTION OF THE DRAWINGS

The above advantages of the invention will become more apparent from the following detailed description of the preferred embodiment in conjunction with the accompanying drawings that are summarized below.

FIG. 1 is a schematic representation of a false twist yarn process employing the novel yarn tension variation detector of the present invention;

FIG. 2 is a cross-sectional view taken on line 2—2 of FIG. 3;

FIG. 3 is a top plan view of two yarn tension measuring devices of the present invention operating in unison;

FIG. 4 is a top plan view of the air jet and associated L-shaped mounting block of the present invention;

FIG. 5 is a side elevational view of the air jet and associated L-shaped mounting block of the present invention;

FIG. 6 is a cross-sectional view taken on line 6—6 of FIG. 5; and

FIG. 7 is a cross-sectional view taken on line 7—7 of FIG. 4.

Corresponding reference characters indicate corresponding parts throughout the several views of the drawings.

DETAILED DESCRIPTION OF THE PREFERRED EMBODIMENT

Referring now by reference numerals to the drawings, and first to FIG. 1 the yarn tension variation detector 10 is employed between the yarn delivery rolls 12, 14 and the draw rolls 16, 18 of a false twist yarn producing system. In a conventional manner, a multi-filament, continuous, fully oriented or partially oriented synthetic yarn 19 is supplied from a supply package 20 to the false twist device 22 through a primary heater 24 by the rolls 12, 14. From the false twist device 22, the false twisted yarn is delivered by the draw rolls 16, 18 and the take-up feed rolls 26, 28 to the take-up package 30 through the secondary heater 32. The false twist device 22 can be any suitable device such as friction discs, pin twister or belt-type.

A yarn tension variation detector can be found in U.S. Pat. No. 4,393,725 which is incorporated herein by reference and U.S. Pat. No. 4,445,322 which is also incorporated herein by reference.

The yarn tension variation detector 10 basically employs air under pressure to vibrate the yarn 19 at its harmonic frequency and employs an infra-red photo detector to measure harmonic frequency of the yarn. A change in the harmonic frequency of the vibrating yarn indicates a change in the yarn tension. The signal from the infra-red detector can be delivered to a read-out device, such as a counter, and an operator can make a manual change in the system or the signal can be supplied to an automatic device, which can be automatically changing roll speeds, etc. to maintain the desired tension on the yarn.

Referring now to FIG. 2, the yarn tension variation detector 10 can be a single unit for a single end of yarn 19 or be a multiple unit for multiple ends of yarn 19, as shown in FIG. 3. Each unit 10 is enclosed by a substantially U-shaped frame 94 having upstanding end plates 95 and 96 respectively. All structural elements in this application can be made of metals, plastics, ceramics, and so forth. End plates 95 and 96 have molded portions to give strength to the entire U-shaped frame 94. Each end plate 95, 96 has a notch 38 and 40 respectively, therein. Mounted around or in each of the notches 38, 40 are replaceable ceramic guides 42 and 44, the opening thereof of a size to accommodate a particular range of yarn diameters or devices.

As indicated in FIG. 2, the yarn 19 passes through the detector in the direction indicated by the arrows, although either direction through the yarn tension variation detector should be operational. The yarn first passes through a divider 90 and then past an infra-red photo detector 48 that measures the frequency of vibration of the yarn 19 and generates a signal. The divider 90 has a notched portion that allows the yarn to pass through freely without contact. This divider 90 is used for overall structural support as well as augmenting the capabilities of automatic yarn feeding systems. This signal can be transmitted to the appropriate automatic response device after being amplified from a 100 millivolt signal to a fifteen volt square wave by amplifier board 80, which is offset from the U-shaped frame 94 and attached to an U-shaped aluminum channel 73, as shown in FIG. 3, and then outward from the amplifier board by means of electrical conductors such wires 81. The signal from the infra-red photo detector 48 is transmitted to the amplifier board 80 by means of wires 150 and connector 82. The yarn 19 is then vibrated as it passes over an air jet 46, which receives air from manifold 47 via connecting conduit 86 that can be of flexible material. The conduit 86 extends between a manifold tube 52 and an air jet tube 53. There is also another conduit that extends between the air jet 46 and the manifold that is not shown. The air jet 46 is mounted on a L-shaped mounting block 70, as shown in FIG. 5, and connected to the U-shaped frame 94 by means of dual bolts 60 and 61 or other attachment means such as adhesives, and so forth. This holds true for all bolt attachments throughout this application. The combination L-shaped mounting block 70 and U-shaped frame 94 is attached to the U-shaped aluminum channel 73 by means of four bolts 62, 63, 64 and 65, as shown in FIGS. 2 and 3.

Referring now to FIGS. 4 and 5, the L-shaped mounting block 70 has two threaded bolt holes 60A and 61A that accommodate the bolts 60 and 61, respectively. The air jet 46 comprises two tubes 56 and 57 that are compressed at their ends to form a substantially oval shape and mounted in the L-shaped mounting block 70 at approximately fifty-three degrees from each other as shown in FIGS. 4 and 7. This range can be from twenty-five to seventy-five degrees and still be operational with the best performance occurring at the center of this range. The opposite end of both tubes 56 and 57 are connected to the air manifold 47 with tube 53 connected via conduit 86.

Referring now to FIG. 6, the longitudinal axis of the oval opening of tube 56 will optimally be forty-five degrees from the longitudinal axis of the oval opening of tube 57, however, this value can vary to lesser degrees of operational success.

Referring now to FIG. 7, tube 56 projects a stream of air 101 that intersects a stream of air 100 emitting from tube 57 at point 120. These projecting streams of air 100, 101 create an oval region of turbulence 110 throughout which the yarn 19 will be able to oscillate at its natural frequency. It is relatively difficult for the yarn to leave this oval region 110 and thus the yarn is consistently maintained in oscillation. Furthermore, the air pressure can be reduced to 3 p.s.i. as opposed to the relatively high pressures of 6 to 8 p.s.i. when using one round air jet.

The invention described is predicated on the fact that a yarn stretched to a certain tension and having a certain length will have a certain harmonic frequency. Then, if the tension of a certain pre-determined length of yarn changes, the harmonic frequency will change. By measuring the harmonic frequency of the vibrating yarn 19, the tension and/or changes of tension in a yarn can be detected. The first natural frequency of a yarn can be found by the following formula:

$$\text{1st Natural Frequency } (f_1) = \frac{1}{2L} \times \sqrt{T/rho}$$

where
L = Length in meters
T = Tension in grams
rho = mass per unit length (grams/meter)
the tension or changes in tension can be computed by measuring the frequency of the vibrating yarn and using the above formula to compute the tension.

In operation, the length of yarn between the guides 42 and 44 and the air from jet 46 is directed against the yarn to cause the yarn 19 to be vibrated at its harmonic frequency. When the yarn 19 passes detector 48, the frequency is measured and the signal generated thereby is delivered to a counter or other suitable device. The counter or other suitable device can be calibrated electronically to incorporate the above formula to provide a direct reading or response to the measured frequency. In this manner, the tension in the yarn 19 is continuously monitored and can be maintained at a substantially constant value.

It is not intended that the scope of the invention be limited to the specific embodiment illustrated and described. Rather, it is intended that the scope of the invention be defined by the appended claims and their equivalents.

What is claimed is:

1. An apparatus to measure the tension in a running length of yarn comprising:
   (a) a frame:
   (b) at least one pair of guide members attached to said frame and longitudinally spaced from one another to guide yarn from end of said frame to the other end of said frame;
   (c) a means to supply air under pressure to vibrate the yarn passing between the guide members to cause said yarn to vibrate at its harmonic frequency and includes a first conduit and a second conduit for projecting streams of air therethrough and mounted at an angle of between twenty-five and seventy-five degrees from each other; and
   (d) a second means mounted in said frame to measure the harmonic frequency of the yarn as it passes through said guide members.

2. The apparatus according to claim 1, wherein said first conduit and said second conduit are mounted at an angle of between thirty-five and sixty-five degrees from each other.

3. The apparatus according to claim 1, wherein said first conduit and said second conduit are mounted at an angle of between forty-five and fifty-five degrees from each other.

4. The apparatus according to claim 1, wherein said first conduit and said second conduit are mounted at an angle of between fifty and fifty-five degrees from each other.

5. The apparatus according to claim 1, wherein said first conduit has a substantially oval orifice where said streams are emitted and having a longitudinal axis and said second conduit has a substantially oval orifice where said streams are emitted and having a longitudinal axis with an angle of intersection between the longitudinal axis of said first conduit and the longitudinal axis of said second conduit ranging from twenty-five to seventy-five degrees.

6. The apparatus according the claim 1, wherein said first conduit has a substantially oval orifice where said streams are emitted and having a longitudinal axis and said second conduit has a substantially oval orifice where said streams are emitted and having a longitudinal axis with an angle of intersection between the longitudinal axis of said first conduit and the longitudinal axis of said second conduit ranging from thirty to sixty-five degrees.

7. The apparatus according to claim 1, wherein said first conduit has a substantially oval orifice where said streams are emitted and having a longitudinal axis and said second conduit has substantially oval orifice where said streams are emitted and having a longitudinal axis with an angle of intersection between the longitudinal axis of said first conduit and the longitudinal axis of said second conduit ranging from thirty-five to fifty-five degrees.

8. The apparatus according to claim 1, wherein said first conduit has a substantially oval orifice where said streams are emitted and having a longitudinal axis and said second conduit has substantially oval orifice where said streams are emitted and having a longitudinal axis with an angle of intersection between the longitudinal axis of said first conduit and the longitudinal axis of said second conduit ranging from forty to fifty degrees.

9. The apparatus according to claim 1, wherein said first conduit has a substantially oval orifice where said streams are emitted and having a longitudinal axis and said second conduit has substantially oval orifice where said streams are emitted and having a longitudinal axis with an angle of intersection between the longitudinal axis of said first conduit and the longitudinal axis of said second conduit being substantially forty-five degrees.

10. An apparatus to measure the tension in a running length of yarn comprising:
(a) a frame;
(b) at least one pair of guide members attached to said frame and longitudinally spaced from one another to guide yarn from end of said frame to the other end of said frame;
(c) a means to supply air under pressure to vibrate the yarn passing between the guide members to cause said yarn to vibrate at its harmonic frequency and includes a first conduit and a second conduit for projecting streams of air therethrough and mounted at a first angle from each other and said first conduit having a substantially oval orifice where said streams are emitted and having a longitudinal axis and said second conduit having a substantially oval orifice where said streams are emitted and having a longitudinal axis with a second angle of intersection between the longitudinal axis of said first conduit and the longitudinal axis of said second conduit; and
(d) a second means mounted in said frame to measure the harmonic frequency of the yarn as it passes through said guide members.

11. The apparatus according to claim 10, wherein said first angle is between twenty-five and seventy-five degrees and said second angle is between twenty-five and seventy-five degrees.

12. The apparatus according to claim 10, wherein said first angle is between twenty-five and seventy-five degrees and said second angle is between thirty-five and sixty-five degrees.

13. The apparatus according to claim 10, wherein said first angle is between twenty-five and seventy-five degrees and said second angle is between forty and fifty degrees.

14. The apparatus according to claim 10, wherein said first angle is between thirty-five and sixty-five degrees and said second angle is between twenty-five and seventy-five degrees.

15. The apparatus according to claim 10, wherein said first angle is between thirty-five and sixty-five degrees and said second angle is between thirty-five and sixty-five degrees.

16. The apparatus according to claim 10, wherein said first angle is between thirty-five and sixty-five degrees and said second angle is between forty and fifty degrees.

17. The apparatus according to claim 10, wherein said first angle is between forty-five and sixty degrees and said second angle is between twenty-five and seventy-five degrees.

18. The apparatus according to claim 10, wherein said first angle is between forty-five and sixty degrees and said second angle is between thirty-five and sixty-five degrees.

19. An apparatus to measure the tension in a running length of yarn comprising:
(a) a frame;
(b) at least one pair of guide members attached to said frame and longitudinally spaced from one another to guide yarn from end of said frame to the other end of said frame;
(c) a means to supply air under pressure to vibrate the yarn passing between the guide members to cause said yarn to vibrate at its harmonic frequency and includes a first conduit and second conduit for projecting streams of air therethrough and mounted at a first angle of between forty-five and sixty degrees to each other and said first conduit having a substantially oval orifice where said streams are emitted and having a longitudinal axis and said second conduit having a substantially oval orifice where said streams are emitted and having a longitudinal axis with a second angle between the longitudinal axis of said first conduit and the longitudinal axis of said second conduit ranging from forty to fifty degrees; and
(d) a second means mounted in said frame to measure the harmonic frequency of the yarn as it passes through said guide members.

* * * * *